No. 730,073. PATENTED JUNE 2, 1903.
J. M. ALDERFER.
VEHICLE WHEEL.
APPLICATION FILED DEC. 1, 1902.
NO MODEL.
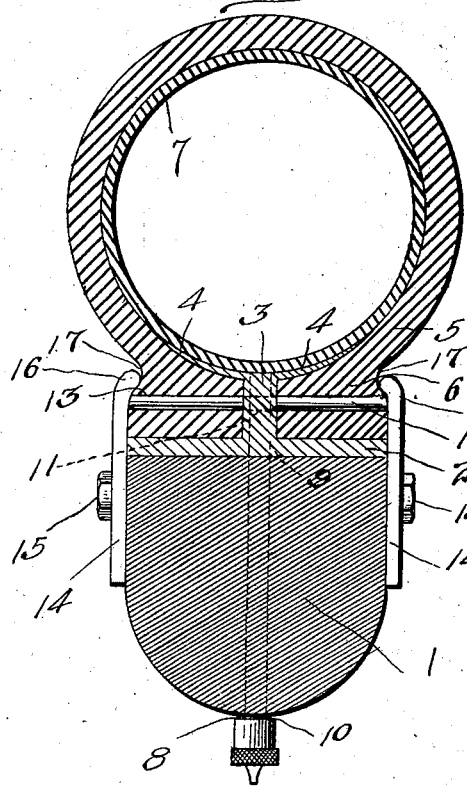
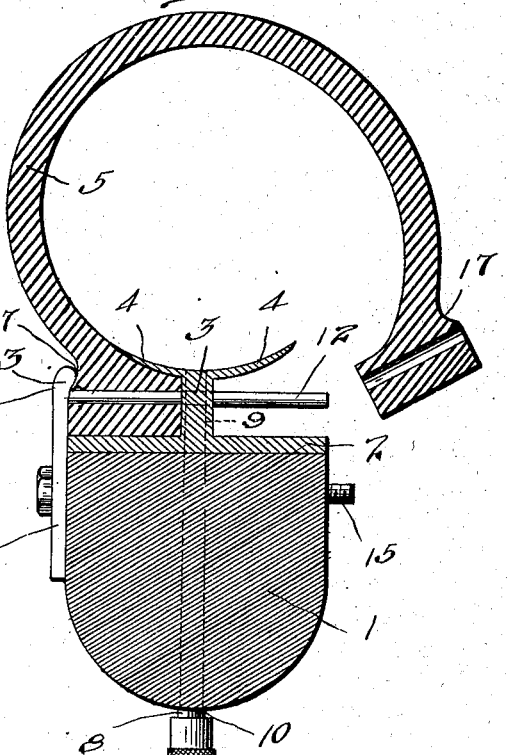
Witnesses
Jas A. G. Koehl.
L. Hilton
Inventor
John M. Alderfer
By H. B. Willson & Co
Attorneys No. 730,073. Patented June 2, 1903.

UNITED STATES PATENT OFFICE.

JOHN M. ALDERFER, OF SHARON CENTER, OHIO.

VEHICLE-WHEEL.

SPECIFICATION forming part of Letters Patent No. 730,073, dated June 2, 1903.

Application filed December 1, 1902. Serial No. 133,417. (No model.)

*To all whom it may concern:*

Be it known that I, JOHN M. ALDERFER, a citizen of the United States, residing at Sharon Center, in the county of Medina and State of Ohio, have invented certain new and useful Improvements in Automobile and other Vehicle Wheels; and I do declare the following to be a full, clear, and exact description of the invention, such as will enable others skilled in the art to which it appertains to make and use the same.

My invention relates to an improvement in automobile and other vehicle wheels, particularly with reference to the construction of the tires thereof and the means for attaching the tires thereto; and it consists in the peculiar construction and combination of devices herein fully described, and pointed out in the claims.

The object of my invention is to provide a novel construction of the outer cushioning-tire and to combine therewith a metal rim or tire and fastening means for detachably connecting the cushioning-tire to the metal rim or tire which will prevent the creeping of the tire on the wheel, will prevent the displacement of the cushioning-tire laterally, and will also enable the cushioning-tire to be readily opened to permit access to the inner inflatable tire, hence peculiarly adapting my improved construction of tire for use on automobile-wheels.

In the accompanying drawings, Figure 1 is a transverse sectional view through the rim or felly of a wheel provided with my improved tire and means for fastening the same to the wheel-rim. Fig. 2 is a similar view showing the outer cushioning-tire partly open to permit access to the inner inflatable tire.

In the embodiment of my invention I provide a channel-iron rim or tire 2, which is fitted on the wooden rim or felly 1 of the wheel and is provided on its outer side with an annular flange 3, which is preferably disposed midway between the sides thereof, and the said flange is provided at its outer side with the laterally-extending duck-fly or flange 4, which is concavo-convex in cross-section and projects laterally beyond each side of the flange 3.

The outer cushioning-tire 5 may be made of rubber or other suitable material and may be of any suitable form. As here shown, it is cylindrical in cross-section and is provided at its inner side forming its base with flanges 6, which are adapted to fit on the channel-iron rim on opposite sides of the flange 3 and between the tread portion of the channel-iron rim and the approximate end of the duck-fly flange 4, the said outer cushioning-tire being divided longitudinally on its inner side, so that it may be opened, as shown in Fig. 2, to permit ready access to be obtained to the inner inflatable tire 7, the latter being also constructed of rubber or other suitable material and being here shown as cylindrical in cross-section. The valve-stem 8 of the inner tire 7, through which the latter is inflated, is inserted in and passes through coincident openings 9 10, which are radially disposed in the channel-iron rim 2 and the felly or rim 1 and pass therethrough and through the flange 3 of the channel-iron rim.

To prevent creeping of the tire on the channel-iron rim, the flange 3 thereof is provided at suitable regular intervals with transverse openings 11, in which are inserted securing-pins 12, which are disposed transversely with reference to the channel-iron rim and pass through openings 13, with which the split base portions of the outer cushioning-tire 5 are provided. On opposite sides of the tire or felly 1, at suitable distances apart, are flange-irons 14, which are detachably secured by means of bolts 15 and which bear against the side edges of the channel-iron rim 2 and the base portions 6 of the outer cushioning-tire, the outer ends of the said flange-irons being inturned, as at 16, and engage with correspondingly-shaped grooves 17, with which the split base portions of the outer tire 5 are provided. It will be understood that by removing the flange-irons from one side of the wheel one side of the base of the outer tire 5 may be released, so that said outer tire may be opened to permit access to the inner inflatable tire 7, hence enabling punctures to be readily repaired.

It will be understood that by the provision of the flange 3 of the channel-iron rim and the provision of the flange-irons which bear against the outer sides of the base portion of the outer cushioning-tire the latter is securely fastened on the wheel, so that it cannot be detached therefrom by any lateral stress to which it may be subjected when the vehicle is describing a curve. It will be furthermore understood that the cross-pins 12 also contribute to secure the outer cushioning-tire to the wheel and that said cross-pins effectually prevent creeping of the tire on the wheel. The duck-fly or flange 4 forms a broadened bearing-surface for the inner side of the inner inflatable tube and prevents the latter from being worn and cut by the flange 3.

Within the scope of my invention the inner inflatable tire may be entirely dispensed with, and I do not, therefore, limit myself in this particular; neither do I desire to limit myself in other respects to the precise construction and arrangement of devices herein shown and described, as it is obvious that modifications may be made therein without departing from the spirit of my invention and within the scope of the appended claims.

Having thus described my invention, what I claim as new, and desire to secure by Letters Patent, is—

1. In combination with a wheel having a peripheral flange provided with a laterally-extended tread projecting from opposite sides thereof, pins extending laterally from opposite sides of said flange, a tire having a split base bearing on the rim, against opposite sides of said flange, and under its laterally-extended tread, and having openings through which the pins extend, and detachable securing means engaging the outer sides of the split base portions of the tire and retaining the same in place on the rim, substantially as described.

2. In combination with a wheel having a peripheral flange provided with a laterally-extended tread projecting from opposite sides thereof and curved transversely, with its concave side outermost, a tubular tire having a split base bearing on the rim, against opposite sides of the flange and under the laterally-extended tread thereof, and securing means engaging the outer sides of the split base portions of the tire and retaining the same in place on the rim, substantially as described.

3. In combination with a wheel having a peripheral flange provided with a laterally-extended tread portion projecting from opposite sides thereof and curved transversely, with its concave side outermost, a tubular tire having a split base bearing on the rim, against opposite sides of the flange and under the laterally-extended tread thereof, an inner tire, within the tubular tire and lying in the concave side of said tread, and means to secure the split base portions of the tire and retain the same in place on the rim, substantially as described.

In testimony whereof I have hereunto set my hand in presence of two subscribing witnesses.

JOHN M. ALDERFER.

Witnesses:
   J. C. VAN ORMAN,
   A. C. VAN ORMAN.